(12) United States Patent
Manson et al.

(10) Patent No.: US 6,543,051 B1
(45) Date of Patent: Apr. 1, 2003

(54) EMERGENCY ALERT SYSTEM

(75) Inventors: Azita M. Manson, Duluth, GA (US); Timothy H. Addington, Roswell, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/368,561

(22) Filed: Aug. 5, 1999

Related U.S. Application Data
(60) Provisional application No. 60/095,747, filed on Aug. 7, 1998.

(51) Int. Cl.[7] .................. H04N 7/025; H04N 7/173; H04N 11/00; H04N 7/08; H04M 11/00
(52) U.S. Cl. .................. 725/33; 725/34; 725/36; 725/108; 348/461; 348/473; 455/404
(58) Field of Search .................. 725/33–34, 108, 725/36, 114, 116, 138, 144, 146; 348/461, 473; 455/404

(56) References Cited

U.S. PATENT DOCUMENTS

| | | | | |
|---|---|---|---|---|
| 3,848,193 A | * | 11/1974 | Martin et al. .................. 325/53 |
| 4,155,042 A | * | 5/1979 | Permut et al. .................. 325/64 |
| 4,536,791 A | * | 8/1985 | Campbell et al. .................. 358/122 |
| 4,686,564 A | * | 8/1987 | Masuko et al. .................. 358/86 |
| 5,121,430 A | * | 6/1992 | Ganzer et al. .................. 380/48 |
| 5,701,161 A | * | 12/1997 | Williams et al. .................. 348/468 |
| 5,760,820 A | * | 6/1998 | Eda et al. .................. 348/9 |
| 5,768,375 A | * | 6/1998 | Yamauchi et al. .................. 380/10 |
| 5,825,407 A | * | 10/1998 | Cowe et al. .................. 348/6 |
| 5,907,793 A | * | 5/1999 | Reams .................. 455/3.1 |
| 6,020,913 A | * | 2/2000 | Bush et al. .................. 348/9 |
| 6,119,159 A | * | 9/2000 | Tseng et al. .................. 709/224 |
| 6,134,566 A | * | 10/2000 | Berman et al. .................. 707/526 |
| 6,304,573 B1 | * | 10/2001 | Hicks, III .................. 370/401 |
| 6,464,585 B1 | * | 10/2002 | Hendricks et al. .................. 725/35 |

OTHER PUBLICATIONS

Dave Halperin– May 3, 2000, "HU–961– A Cost Effective EAS Compliance Solution," pp. 1–3.*

* cited by examiner

*Primary Examiner*—Andrew Faile
*Assistant Examiner*—Son P. Huynh
(74) *Attorney, Agent, or Firm*—Hubert J. Barnhardt, III; Kenneth M. Massaroni; Shelley L. Couturier

(57) ABSTRACT

A system for inputting conventional emergency alert messages into a digital subscriber television system. The method allows existing emergency alert equipment to interface with the digital system equipment in the headend of a digital subscriber television system. A unique identifier and the format of the digital emergency alert message allow the input of an emergency alert message and allow for a wide variety of optional data formats, system control options, and data storage options.

26 Claims, 4 Drawing Sheets

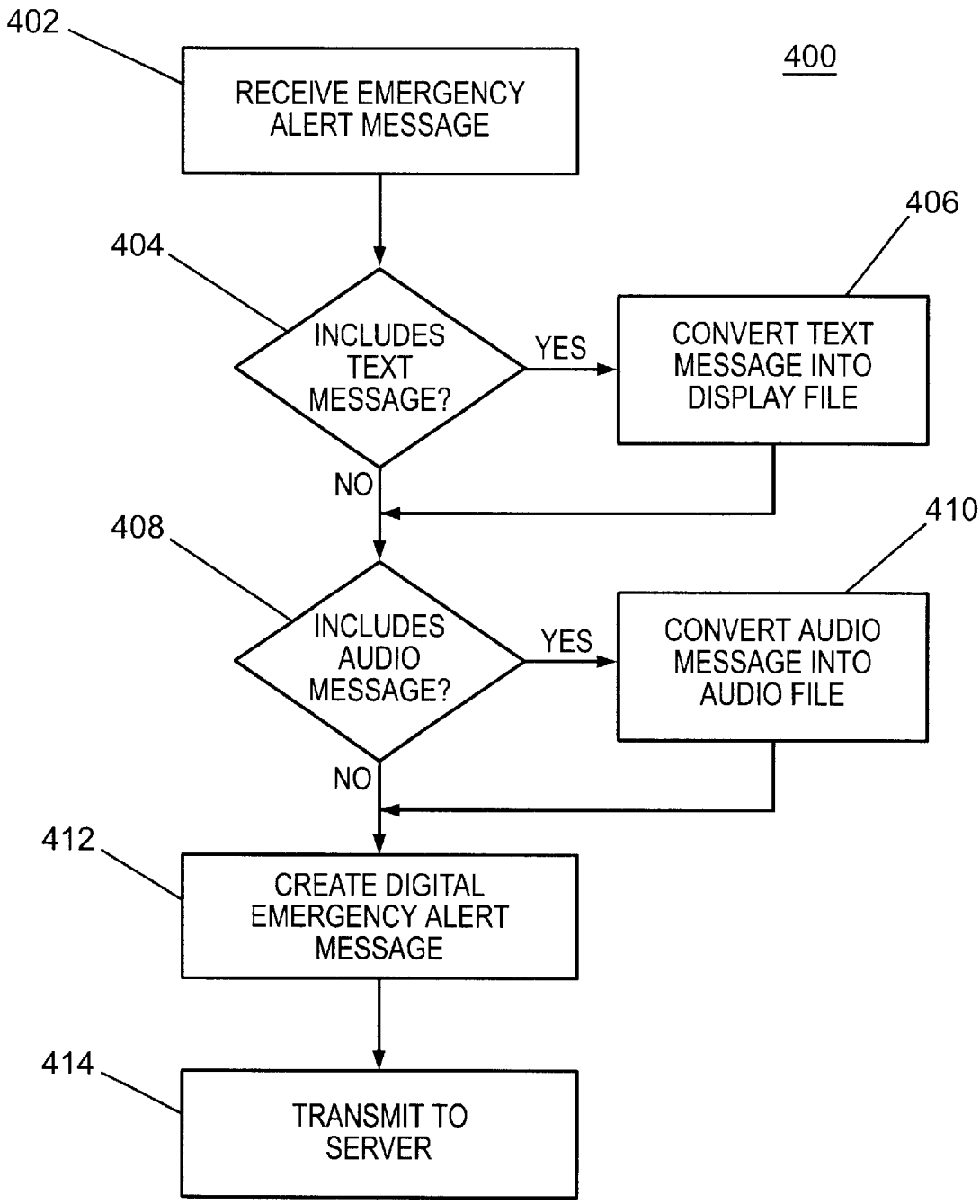

EMERGENCY ALERT SYSTEM

CROSS-REFERENCE TO RELATED APPLICATIONS

The present application claims priority to U.S. Provisional Patent Application No. 60/095,747, Miahnahri et al., entitled Emergency Alert System, filed Aug. 7, 1998.

FIELD OF THE INVENTION

This present invention relates to inputting emergency alert messages into digital subscriber television systems and, more specifically, to reformatting the emergency alert message to retain the existing information and provide for the various format and information requirements of a digital subscriber television system.

BACKGROUND OF THE INVENTION

In a subscriber television system, an emergency alert system is used to warn subscribers of severe weather or of national emergencies. Upon receiving an emergency alert message, the subscriber television system must integrate the message into the television signal for delivery and display to the subscribers. Emergency alert systems are well established in analog subscriber television systems. The transition from analog to digital subscriber television systems typically requires the replacement of the supporting auxiliary equipment, such as the emergency alert messaging system. This is because the methods and requirements for inserting an Emergency Alert Message (EAM) into an analog system differ from those for inserting an EAM into a digital system.

A typical method of inserting an emergency alert message in an analog system is illustrated in FIG. 1. Current analog subscriber television systems 101 receive an emergency alert signal at an Emergency Alert System (EAS) receiver 105. An Emergency Alert Controller (EAC) 106, which is interfaced to or contained within the EAS, allows the analog subscriber television system operator to control the display parameters of the emergency alert messages. In the headend 103 of the analog subscriber television system 101, the emergency alert message is overlaid on the desired channel (s) by inputting the message into the modulator 107 (1–n) that processes the desired channel's signal. The signal is then combined in combiner 109 and transmitted over a transmission medium 110 to a subscriber location 120 with the emergency alert message overlaid on the channel.

In a digital subscriber television system, the system usually carries a greater number of channels and each modulator typically processes a multiplexed data stream that includes encoded data for multiple channels. An attempt to make the digital system work like the analog system would have the EAM being input into the QAM modulator, which would then have to overlay the EAM on the desired channels within the multi-channel signal. This would require the modulator to perform the additional tasks of de-multiplexing, decoding, overlaying, re-encoding, and re-multiplexing the digital data stream. The various types of digital subscriber television systems have more efficient methods of transmitting information to the subscriber equipment once the information is input into the digital subscriber television system. An EAM needs to be input into a digital subscriber television system so that the digital subscriber television system can use the method most efficient for that particular type of digital subscriber television system.

The various digital subscriber television systems use a wide variety of different data formats for both text and audio data. Any method, system, or message format for the inputting of emergency alert messages into a digital subscriber television system needs to be able to work with multiple data formats. For example, one system might use a Hyper Text Markup Language (HTML) format for text data and other systems might employ an American Standard Code for Information Interchange (ASCII) format.

Thus, there is a need for an efficient method, system, and message format that will allow the inputting of emergency alert messages into a digital subscriber television system rather than an analog modulator. Such an efficient method, system, and message format should support a wide variety of text and audio formats.

BRIEF DESCRIPTION OF THE DRAWINGS

FIG. 4 illustrates a method for converting a conventional emergency alert message into a digital emergency alert message.

DETAILED DESCRIPTION

Figure 1:
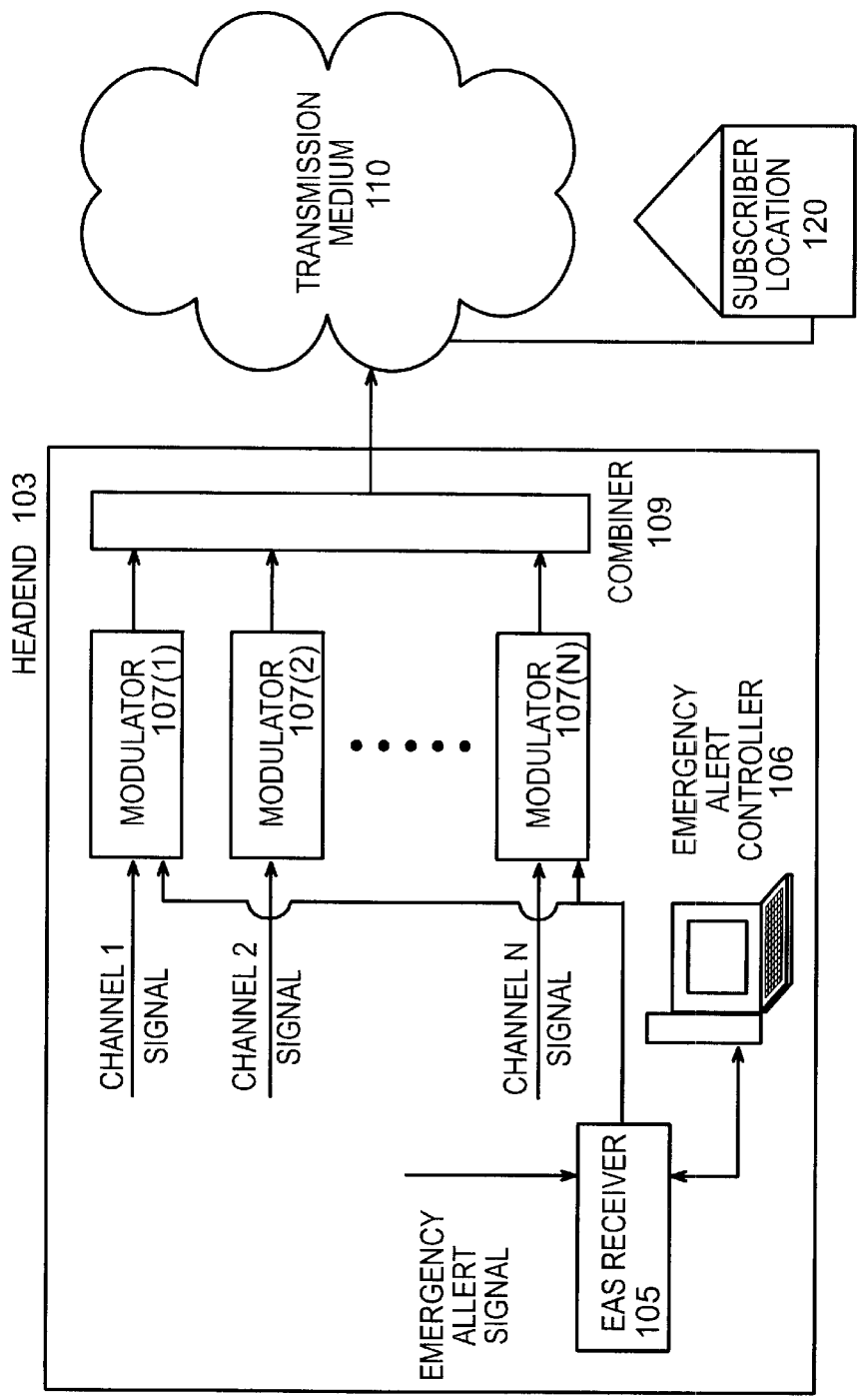
FIG. 1 is an overview of an analog television system with an emergency alert system.

The present invention is directed to an efficient method, system, and message format for inputting an emergency alert message into a digital subscriber television system, such as a cable television system. The present invention provides an interface from components of existing emergency alert systems to systems that transport emergency alert messages within a digital subscriber television system. An example of a system for transporting the emergency alert messages within a digital subscriber television system is provided in U.S. Provisional Patent Application No. 60/143,835, entitled"Framework, Mechanism, and User-interface for Multimedia Messaging in a Cable or Satellite Subscriber Network", filed Jul. 4, 1999, which is incorporated herein by reference.

In an exemplary embodiment, the present invention provides a message format for the inputting of emergency alert messages from an existing Emergency Alert System (EAS) receiver and Emergency Alert Controller (EAC) combination into an emergency alert receiver application server of a digital subscriber television system. The message format of the present invention allows a subscriber television system to utilize the existing EAS receiver and EAC combination from the analog system for inputting emergency alert messages into a digital system. Referring now to the drawings, in which like numerals represent like elements throughout the several figures, the present invention will be described.

A DIGITAL SUBSCRIBER TELEVISION SYSTEM

Figure 2:
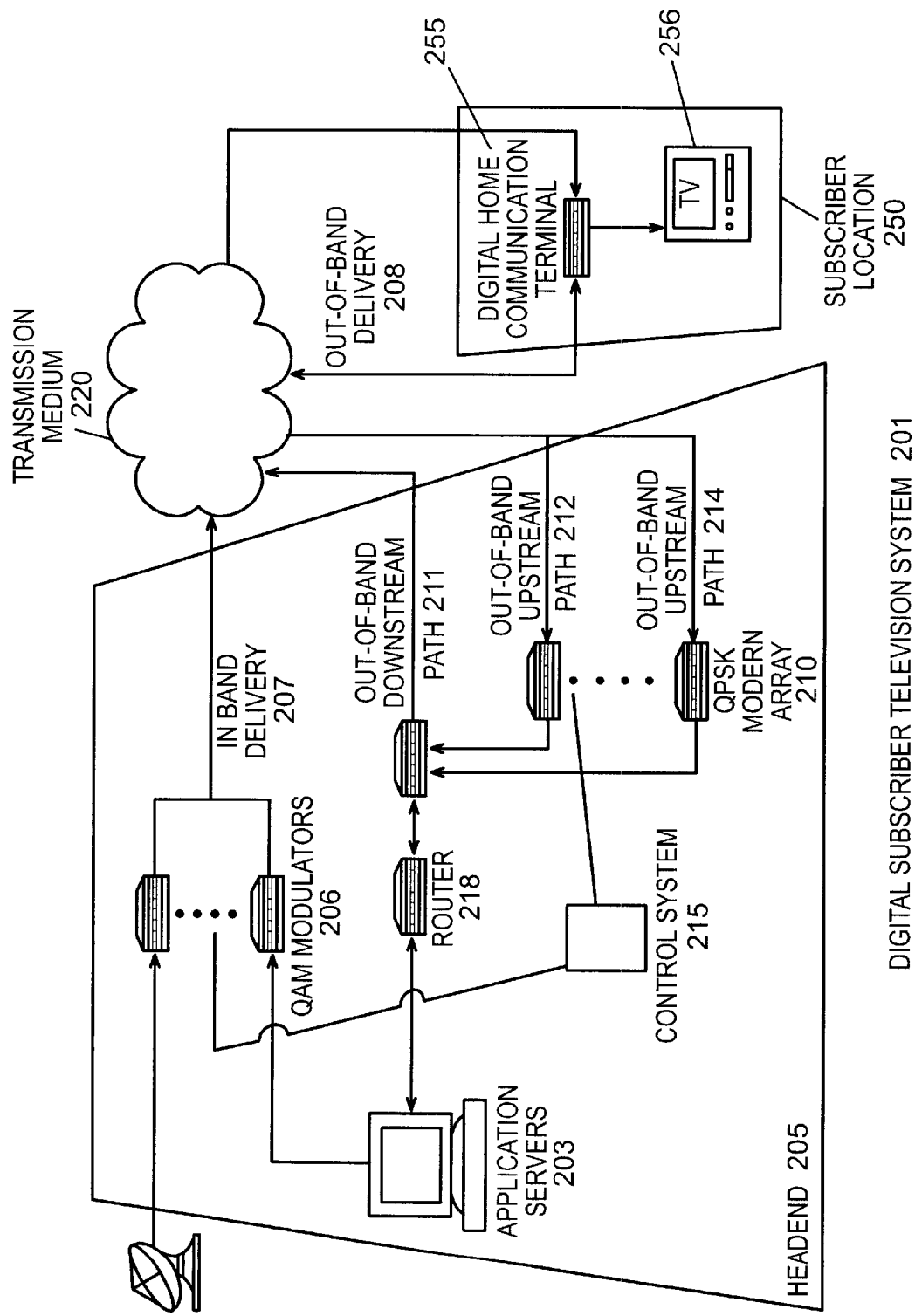
FIG. 2 is an overview of a digital subscriber television system.

FIG. 2 is an overview of a digital subscriber television system 201, which provides the context for a discussion of the present invention. In this discussion, the digital subscriber television system 201 is also referred to as a Digital Broadband Delivery System (DBDS). The digital subscriber television system 201 uses MPEG transport streams for delivery of video, audio, and data entertainment services. These services are delivered via a broadband network to a plurality of Home Communications Terminals (HCTs), such as the HCT 255 at subscriber location 250. An overview of the DBDS is provided in U.S. patent application Ser. No. 09/126,921, entitled"Conditional Access System", which is incorporated herein by reference.

In the digital subscriber television system 201, MPEG content source 202 provides MPEG formatted video, audio and control information to the digital headend 205. The MPEG content source 202 can be any of a variety of equipment such as a satellite receiver, a local encoder, or an application server 203. The MPEG formatted video, audio, and control information is processed in digital headend 205. The information is then combined with the other information specific to the digital subscriber television system 201, such as local programming and control information.

In the DBDS, video, audio, and control information are encoded into MPEG program streams, which are multiplexed to form MPEG transport streams. Each MPEG transport stream is assigned to a Quadrature Amplitude Modulation (QAM) modulator 206 and modulated to a desired frequency. The QAM modulators 206 combine the MPEG formatted information for delivery as the in-band data 207 via the transmission medium 220 to the subscriber location 250. The transmission medium 220 can incorporate one or more of a variety of media, such as fiber, coax, Hybrid Fiber-Coax (HFC), or other transmission media.

The digital HCT 255 at subscriber location 250 receives and decodes the in-band data 207. For the HCT 255 to receive a television program, the HCT 255 must tune to the frequency containing the television program, de-multiplex the associated MPEG transport stream, and decode the appropriate MPEG program streams. The decoded television program is then transmitted to the TV 256 by the HCT 255 for display to the subscriber.

Control information and other data can be communicated as in-band data 207 or as out-of-band data 208. The out-of-band data 208 is transmitted to the HCT 255 by the Quadrature Phase-Shift Keying (QPSK) modem array 210 via out-of-band downstream path 211. Two-way communication utilizes the upstream portion of the out-of-band delivery system. Out-of-band data from the HCT 255 is received in headend 205 via out-of-band paths 212 or 214 between the HCT 255 and the QPSK modem array 210. The out-of-band control information is routed through router 218 to an application server 203. The out-of-band control information includes such information as a pay-per-view purchase instruction and a pause viewing command from the subscriber location 250 to a video-on-demand type application server. A control system 215, such as Scientific-Atlanta's Digital Network Control System (DNCS), monitors, controls, and coordinates all communications in the digital subscriber television system 201, including video, audio, and data.

THE EMERGENCY ALERT SYSTEM

FIG. 1 illustrated the typical equipment for inserting an emergency alert message into an analog system. With the transition to digital subscriber television systems, subscriber television system operators are faced with huge transition costs including the cost of new digital equipment and upgrading existing equipment to comply with the digital system requirements. A digital subscriber television system has different signaling needs and requirements than an analog system. (e.g., QAM modulators, digital input signals, and MPEG data packets) During the transition from analog to digital, a subscriber television system may operate a hybrid system that includes co-located analog and digital systems. The present invention allows use of the existing EAS equipment for both analog and digital systems. The present invention allows the existing EAS equipment to implement the present invention, communicate conventional EAS messages to a digital subscriber television system, and still provide analog input to the analog system. Thus, the present invention provides a cost saving to the system operators by allowing the modification of existing equipment, rather than requiring the purchase of new digital equipment.

The present invention works with the existing national EAS broadcast system and EAS receivers to provide a generic interface into digital subscriber television systems. The present invention defines a digital EAS message format that includes the existing EAS message information and addresses the needs of a digital subscriber television system. There are many different digital subscriber television systems with many different data formats. The message format of the present invention allows for a variety of data file formats, such as American Standard Code for Information Interchange (ASCII) or Hyper Text Markup Language (HTML) for text data and Resource Interchange File Format (RIFF) Wave (WAV) format, Creative Voice format (VOC), or Audio Interchange File Format (AIFF) for audio data. By defining a flexible message format, the existing EAS messages can be provided to any digital subscriber television system with the data files in a compatible format. Once input into the digital subscriber television system, the EAS message must be integrated with the other digital information and transmitted to the subscribers. If necessary, the digital subscriber television system can reformat the entire EAS message in a system specific digital format for delivery to the digital HCT, which will cause the message to be displayed and heard on the subscriber television. The present invention provides a method, system, and message format for inputting conventional EAS messages into the digital subscriber television system.

Figure 3:
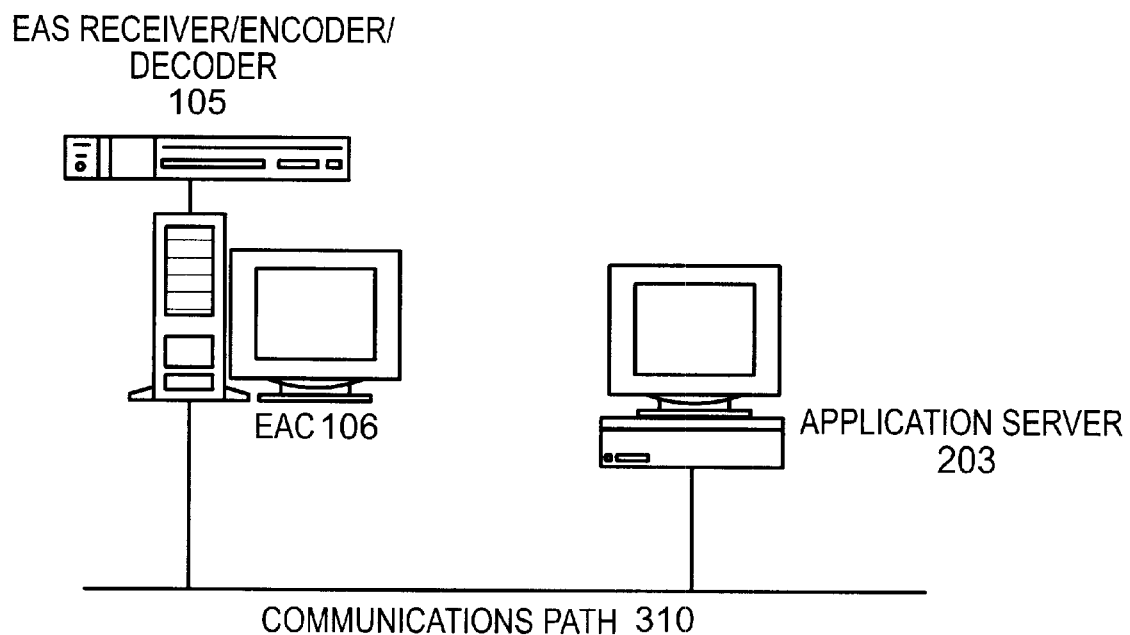
FIG. 3 is an overview of a communications path between the existing Emergency Alert System (EAS) equipment and the application server of a digital subscriber television system.

FIG. 3 is an overview of a communications path between the existing EAS equipment and the application server 203 of a digital subscriber system. The existing EAS equipment, such as EAS receiver 105 and Emergency Alert Controller (EAC) 106, receives an emergency alert message. The EAS equipment converts the message into the message format of the present invention and communicates a digital emergency alert message to the application server 203. The application server 203 can be any of a variety of hardware configurations, such as a dedicated server or a single card in a multipurpose server. The digital emergency alert message is communicated over communications path 310. The communications may be implemented using a wide variety of communications means, such as a Universal Serial Bus (USB) connection, Transmission Control Protocol/Internet Protocol (TCP/IP) over Ethernet, or any general communication method supported by application server 203. In an exemplary embodiment, the communications path 310 includes TCP/IP over Ethernet to a dedicated port on an Emergency Alert Receiver Server (EARS). The EARS is a single card Daemon server that constantly listens for communications from the EAS equipment.

FIG. 4 illustrates a method 400 for converting an emergency alert message received by a conventional EAR system into a digital emergency alert message for delivery to a digital subscriber television system. The existing EAR equipment can be modified to perform this method 400. In an exemplary embodiment, the existing EAS equipment receives an Emergency Alert Message (EAM) at step 402. The existing EAS equipment then determines if the EAM contains a text message at step 404. If there is a text message, the method 400 proceeds to step 406 where the text message is converted by the existing EAS equipment into a text display file compatible with the digital subscriber system, such as an HTML or ASCII display file. Following the conversion of the text file or if there is no text file, the method 400 proceeds to step 408 where the existing EAS equipment determines if the EAM contains an audio file. If there is an audio file, the method 400 goes to step 410 where the audio file is converted by the existing EAS equipment into an audio file compatible with the digital subscriber system, such as a RIFF Wave or AIFF audio file. Following the conversion of the audio file or if there is no audio file, the method 400 proceeds to step 412 where the existing EAS equipment creates a digital emergency alert message. The digital emergency alert message may include a display file and an audio file, may indicate that there is no file (e.g., there may be no audio file), or indicates the location of a display or audio file. The created digital EAM is transmitted to application server 203, at step 414.

The format of the digital emergency alert message of the present invention provides a flexible and unique message format for inputting an emergency alert message from existing EAS equipment into a digital subscriber television system. The format of the digital emergency alert message, as created and provided by the modified existing EAS equipment, includes unique fields and incorporates existing information required for emergency alert messages. The digital EAM format provides a unique name to identify the message. The unique message name field allows flexibility in constructing digital messages, such as allowing one EAS message to be transmitted as multiple digital messages. In addition, this digital EAM format allows flexibility in handling the text and audio files, such as storing display and audio file on the existing EAS equipment, on the application server 203, or elsewhere within either the existing or digital system to allow convenient access for the digital subscriber system. The format of the digital emergency alert message includes the elements normally associated with an emergency alert message, such as the applicable geographic area (e.g., counties), origination time, and the duration of the alert. Also included is a field for one of the event codes associated with an emergency alert message and defined by the Federal Communication Commission (FCC).

An exemplary embodiment of a digital emergency alert message of the present invention is provided below in Table 1.

TABLE 1

| Syntax (Field) | Type | Range | No. of characters |
| --- | --- | --- | --- |
| msg_name | char<8> | | 8 |
| num_counties | char<2> | 0..32 | 2 |
| for (i = 0; i < num_counties; i++){ | char<6> | | 6 |
| FIPS_code | | | |
| } | | | |
| org_time | char<7> | | 7 |
| duration | char<4> | | 4 |
| event_code | char<3> | | 3 |
| display_flag | char<1> | "0"; "1"; "2"; "3" | 1 |
| audio_flag | char<1> | "0"; "1"; "2"; "3"; "4"; "5" | 1 |
| display_length | char<4> | "0000"–"FFFF" | 4 |
| audio_length | char<4> | "0000"–"FFFF" | 4 |
| for(i = 0; i < display_length; i++){ | char<n> | N/A | 1 |
| display_byte | | | |
| } | | | |
| for(i = 0; i < audio_length; i++){ | char<n> | N/A | 1 |
| audio_byte | | | |
| } | | | |

Each field of an exemplary embodiment of a digital emergency alert message either incorporates the existing EAS message information or provides the flexibility required for inputting the digital emergency alert message into a digital subscriber television system or both. In an exemplary embodiment, each field is typically in an ASCII format. Each field is described below.

The message name field (msg_name) provides a unique name to identify the digital emergency alert message.

The number of counties field (num_counties) specifies the number of the destination counties for the digital emergency alert message. A value of "00" means that the message is destined for all counties.

The Federal Information Processing System (FIPS) code field specifies the identification code of each county that is to receive the digital emergency alert message in accordance with the FIPS codes that are defined by the FCC.

The origination time (org_time) specifies the origination time of the message in Greenwich Mean Time (GMT) and is formatted in days, hours, and minutes (JJJHHMM); where JJJ is Julian calendar days.

The duration field (duration) specifies the length of the event in minutes. This value defines the duration for which this message is active. The value is set to zero for an open-ended message, such as an Emergency Action Notification (EAN) or an Emergency Action Termination (EAT), or for a special End of Message (EOM) code sent at the end of an EAN or EAT message. The value is also set to zero if a message needs to be repeated only once.

The event code field (event_code) is one of the 32 FCC defined event codes for EAS or a special EOM code. The event codes are listed in Table 2. An EAN code means an open-ended message has started. An EAT code normally determines when an emergency notification will end. The EAT code terminates an active EAN message, which has not been terminated by an EOM. The EAT code needs an EOM code at the end. An EOM code means that an open-ended message should be terminated. This message is sent at the end of either an EAN and EAT message to terminate them. An EOM code should not be sent at the end of any other messages.

The display flag field (display_flag) specifies the nature of the display content field. The display content field is associated with the display file created when the EAS message contains text data. The flag can indicate that no display data is in the display content field, the location of the display data, or the format of the display data in the display content field. In an exemplary embodiment, ASCII characters can be used as the flag values. A "0"(df_None) means there is no text message and the content of the display content field is not applicable. A "1"(df_ASCII) means the content of DisplayContent field are ASCII characters. A "2" (df_HTML) means the content of display content field are HTML formatted characters. A "3"(df_FTP) means, the content of display content field is a relative directory and a file name. The existing EAS equipment can transfer, using File Transfer Protocol (FTP), this file to the EARS prior to sending this message. In an exemplary embodiment, if this field is set to any value other than df_None, the DisplayLength cannot be zero and the display content field should be filled with appropriate content.

The audio flag field (audio_flag) specifies the nature of the audio content field. The audio content field is associated with the audio file created when the EAS message contains audio data. The flag can indicate that no audio data is in the audio content field, the location of the audio data, or the format of the audio data in the audio content field. In an exemplary embodiment, a "0"(af_None) means there is no audio associated with the message and the content of the audio content is not applicable. A "1"(af_AIF) means the content of the audio content field is AIF formatted audio samples. A "2"(af_WAV) means the content of the audio content field is RIFF Wave (WAV) formatted audio samples. A "3"(af_FTP) means the content of the audio content field is a relative directory and file name of the audio file. The existing EAS equipment can transfer (using FTP) this file to the EARS. A "4"(af_VOC) means the content of the audio content field is a Creative Voice (VOC) formatted audio samples. A "5" (af_OpenEnded) means the content of audio content field is information on an open-ended audio stream.

The display length field (display_length) specifies the length of the display content field. This field can not be zero if the display flag is set to anything other than df_None.

The audio length field (audio_length) specifies the length of the audio content field. This field can not be zero if the audio flag is set to anything other than df_None.

The display content field specifies the text part of an EAM. In an exemplary embodiment, if the display flag is df_HTML, this field indicates the text part of the EAM in HTML format. If the display flag is df_ASCII, this field indicates the text part of the EAM in ASCII format. If the display flag is df_FTP, this field indicates the relative directory and filename of the text part of the EAM. If the extension of the filename is ".htm", the file is an HTML file. If the extension of the filename is ".txt", the file is an ASCII formatted file. This field can not be zero if the display flag is set to anything other than df_one.

The audio content field specifies the audio part of the EAM. In an exemplary embodiment, if the audio flag is af_AIF, this field indicates the audio part of the EAM in an AIFF format. If the audio flag is af_WAV, this field indicates the audio part of the EAM in a RIFF WAV format. If the audio flag is af_FTP, this field indicates the relative directory and filename of the audio part of the EAM. If the extension of the filename is ".aif", the audio file is AIFF format. If the extension of the filename is ".wav", the file is RIFF Wave format. If the extension of the filename is ".voc", the file is a Creative Voice format. This field can not be zero if the AudioFlag is set to anything other than af_None.

A description of the event codes is provided below in Table 2.

TABLE 2

| Event Code | Description |
| --- | --- |
| EAN | Emergency Action Notification (National only) |
| EAT | Emergency Action Termination (National only) |
| NIC | National Information Center |
| NPT | National Periodic Test |
| RMT | Required Monthly Test |
| RWT | Required Weekly Test |
| TOA | Tornado Watch |
| TOR | Tornado Warning |
| SVA | Severe Thunderstorm Watch |
| SVR | Severe Thunderstorm Warning |
| SVS | Severe Weather Statement |
| SPS | Special Weather Statement |
| FFA | Flash Flood Watch |
| FFW | Flash Flood Warning |
| FFS | Flash Flood Statement |
| FLA | Flood Watch |
| FLW | Flood Warning |
| FLS | Flood Statement |
| WSA | Winter Storm Watch |
| WSW | Winter Storm Warning |
| BZW | Blizzard Warning |
| HWA | High Wind Watch |
| HWW | High Wind Warning |
| HUA | Hurricane Watch |
| HUW | Hurricane Warning |
| HLS | Hurricane Statement |
| TSA | Tsunami Watch |
| TSW | Tsunami Warning |
| EVI | Evacuation Immediate |
| CEM | Civil Emergency Message |
| DMO | Practice/Demo Warning |
| ADR | Administrative Message |

CONCLUSION

From the foregoing, it will be appreciated that the present invention provides an efficient method, system, and message format for inputting an emergency alert message into a digital subscriber television system. The present invention has been described in relation to particular embodiments, which are intended in all respects to be illustrative rather than restrictive. For example, the exemplary format of the digital message has been described to include an audio indicator for WAVE and AIFF formats. Other audio format options can be easily incorporated. Additional text formats for the display file are also envisioned and can easily be included.

Those skilled in the art will appreciate that although the present invention has been described in the context of TCP/IP over Ethernet. The communications path 310 of the present invention may be implemented using a wide variety of communications means, such as a universal serial bus (USB) connection or any general communication method supported by application server 203.

There are multiple configurations of EAS equipment for receiving and controlling the emergency alert messages currently exist, such as the EAS receiver 105 and EAC 106 combination or a single EAS element that receives, encodes, decodes, and controls an emergency alert message. The present invention provides an interface between a digital subscriber television system and a wide variety of EAS equipment and equipment configurations.

In addition, the digital subscriber television system has been described as a DBDS or two-way interactive cable television system, but the present invention provides a flexible format usable in a wide variety of digital subscriber systems, such as satellite and one-way systems.

In conclusion, while exemplary embodiments of the invention have been illustrated and described, it will be clear that the invention is not so limited. Alternative embodiments will be apparent to those skilled in the art to which the present invention pertains without departing from its spirit or scope. Accordingly the appended claims rather than the foregoing description define the scope of the present invention.

What is claimed is:

1. A method for inputting an emergency alert message into a digital subscriber television system, comprising the steps of:

receiving the emergency alert message;

if the emergency alert message contains a text message, converting the text message into a display file;

if the emergency alert message contains an audio message, converting the audio message into an audio file;

creating a digital emergency alert message including
    a unique message identifier;
    event information associated with the emergency alert message;
    display data information, including at least one of an indicator of the existence of the display file, an indicator of the format of the display file, an indicator of the length of the display file, the location of the display file, and the display file; and
    audio data information, including at least one of an indicator of the existence of the audio file, an indicator of the format of the audio file, an indicator of the length of the audio file, the location of the audio file, and the audio file; and transmitting the digital emergency alert message to the digital subscriber television system.

2. The method of claim 1, wherein the digital emergency alert message is re-transmitted at set time intervals during a valid time period of the emergency alert message.

3. The method of claim 1, wherein the audio file is transmitted separately and stored in a memory device in the digital subscriber television system.

4. The method of claim 1, wherein the audio file is stored in a memory device outside of the digital subscriber television system.

5. The method of claim 1, wherein the format of the audio file is selected from a group comprising: an Audio Interchange File Format, a Resource Interchange File Format Wave format, or a Creative Voice VOC format.

6. The method of claim 1, wherein the display file is transmitted separately and stored in a memory device in the digital subscriber television system.

7. The method of claim 1, wherein the display file is stored in a memory device outside of the digital subscriber television system.

8. The method of claim 1, wherein the format of the display file is selected from a group comprising: American Standard Code for Information Interchange format or Hyper Text Markup Language format.

9. The method of claim 1, wherein the unique message identifier includes a time stamp and an event number.

10. A method for inputting an emergency alert message into a digital subscriber television system, the method comprising the steps of:

receiving the emergency alert message on an emergency alert receiver/controller;

if the emergency alert message contains a text message, converting the text message into a display file;

if the emergency alert message contains an audio message, converting the audio message into an audio file;

creating a digital emergency alert message including
a unique message identifier;
event information associated with the emergency alert message;
display data information, including at least one of an indicator of the existence of the display file, an indicator of the format of the display file, an indicator of the length of the display file, a location of the display file, and the display file; and
audio data information, including at least one of an indicator of the existence of the audio file, an indicator of the format of the audio file, an indicator of the length of the audio file, a location of the audio file, and the audio file; and transmitting the digital emergency alert message from the emergency alert receiver/controller to an application server of the digital subscriber television system; and converting, at the application server, the digital emergency message into a digital format of the digital subscriber television system for delivery to a subscriber receiver.

11. The method of claim 10, wherein the digital emergency alert message is re-transmitted at set time intervals during a valid time period of the emergency alert message.

12. The method of claim 10, wherein the audio file is transmitted separately and stored in a memory device in the digital subscriber television system.

13. The method of claim 10, wherein the audio file is stored in a memory device in the emergency alert receiver/controller.

14. The method of claim 10, wherein the format of the audio file is selected from a group comprising: an Audio Interchange File Format, a Resource Interchange File Format Wave format, or a Creative Voice VOC format.

15. The method of claim 10, wherein the display file is transmitted separately and stored in a memory device in the digital subscriber television system.

16. The method of claim 10, wherein the display file is stored in a memory device in the emergency alert receiver/controller.

17. The method of claim 10, wherein the format of the display file is selected from a group comprising: American Standard Code for Information Interchange format or Hyper Text Markup Language format.

18. The method of claim 10, wherein the unique message identifier includes a time stamp and an event number.

19. A subscriber television system for receiving and displaying an emergency alert message to a subscriber comprising:

emergency alert equipment operative to receiving the emergency alert message, creating a digital emergency alert message, and transmitting the digital emergency alert message, the digital emergency alert message including:
a unique message identifier;
event information associated with the emergency alert message;
display data information, including at least one of an indicator of the existence of a display file, an indicator of the format of the display file, an indicator of the length of the display file, a location of the display file, and the display file; and
audio data information, including at least one of an indicator of the existence of an audio file, an indicator of the format of the audio file, an indicator of the length of the audio file, a location of the audio file, and the audio file;

an application server for receiving the digital emergency alert message and converting the digital emergency message into a format of the subscriber television system; and a subscriber television system headend for transmitting the digital emergency alert message in the format of the subscriber television system to a receiver for display to the subscriber.

20. The system of claim 19, wherein if the emergency alert message contains a text message, the text message is converted into the display file.

21. The system of claim 20, wherein the format of the display file is selected from a group comprising: American Standard Code for Information Interchange format or Hyper Text Markup Language format.

22. The system of claim 19, wherein if the emergency alert message contains an audio message, the audio message is converted into the audio file.

23. The system of claim 22, wherein the format of the audio file is selected from a group comprising: an Audio Interchange File Format, a Resource Interchange File Format Wave format, or a Creative Voice VOC format.

24. The system of claim 19, including the receiver for displaying the emergency alert message to the subscriber.

25. The system of claim 19, wherein the digital emergency alert message is re-transmitted at set time intervals during a valid time period of the emergency alert message.

26. The system of claim 19, wherein the unique message identifier includes a time stamp and an event number.

* * * * *

UNITED STATES PATENT AND TRADEMARK OFFICE
CERTIFICATE OF CORRECTION

PATENT NO. : 6,543,051 B1
DATED : April 1, 2003
INVENTOR(S) : Manson et al.

It is certified that error appears in the above-identified patent and that said Letters Patent is hereby corrected as shown below:

Column 2,
Line 35, delete "User-interface" and insert therefore -- User-Interface --
Line 37, delete "Jul. 4, 1999," and insert therefore -- Jul. 14, 1999, --

Column 5,
Line 40, delete "l++){" and insert therefore -- i++){ --

Column 7,
Line 14, delete "df_one." and insert therefore -- df_None. --

Signed and Sealed this

Twenty-sixth Day of August, 2003

JAMES E. ROGAN
*Director of the United States Patent and Trademark Office*